United States Patent
Hung et al.

(10) Patent No.: US 9,403,307 B2
(45) Date of Patent: Aug. 2, 2016

(54) MODELING APPARATUS AND OPERATION METHOD THEREOF

(71) Applicant: Wistron Corporation, New Taipei (TW)

(72) Inventors: Chun-Yen Hung, New Taipei (TW); Ya-Chi Hsiao, New Taipei (TW)

(73) Assignee: Wistron Corporation, New Taipei (TW)

( * ) Notice: Subject to any disclaimer, the term of this patent is extended or adjusted under 35 U.S.C. 154(b) by 131 days.

(21) Appl. No.: 14/033,529

(22) Filed: Sep. 23, 2013

(65) Prior Publication Data

US 2014/0151932 A1      Jun. 5, 2014

(30) Foreign Application Priority Data

Dec. 4, 2012   (TW) .............................. 101145440 A (51) Int. Cl.
*B29C 45/14*      (2006.01)
*B29C 45/56*      (2006.01)

(52) U.S. Cl.
CPC ......... *B29C 45/14778* (2013.01); *B29C 45/561* (2013.01); *B29C 45/14016* (2013.01)

(58) Field of Classification Search
CPC ................... B29C 45/14016; B29C 45/14336; B29C 45/14778; B29C 45/56; B29C 45/561
See application file for complete search history.

(56) References Cited

U.S. PATENT DOCUMENTS

| | | | | |
|---|---|---|---|---|
| 2,938,232 A | * | 5/1960 | Martin | 425/562 |
| 4,013,392 A | * | 3/1977 | Smith | 425/157 |
| 4,707,321 A | * | 11/1987 | Segawa | B29C 45/263 264/1.33 |
| 5,015,426 A | * | 5/1991 | Maus et al. | 264/40.5 |
| 5,141,430 A | * | 8/1992 | Maus et al. | 425/556 |
| 5,855,824 A | * | 1/1999 | Saito et al. | 264/2.2 |
| 7,922,952 B2 | | 4/2011 | Fujimura | |

(Continued)

FOREIGN PATENT DOCUMENTS

| | | |
|---|---|---|
| CN | 101218084 A | 7/2008 |
| CN | 101808794 A | 8/2010 |

(Continued)

OTHER PUBLICATIONS

Office action mailed on May 27, 2015 for the Taiwan application No. 101145440, filed: Dec. 4, 2012, p. 2 line 15-26, p. 3 and p. 4 line 1-4 Translation.

(Continued)

*Primary Examiner* — Jill Heitbrink
(74) *Attorney, Agent, or Firm* — Winston Hsu; Scott Margo (57) ABSTRACT

A modeling apparatus includes a first set and a second set. The first set includes a body and a first mold structure, the first mold structure is disposed on a surface of the body. The second mold includes a movable portion, a first pushing mechanism, a valve and a second pushing mechanism. A second mold structure of the movable portion is combined with the first mold structure to form an accommodating space. The first pushing mechanism is connected to the movable portion for moving the movable portion, so as to combine the second mold structure with the first mold structure. The valve is disposed on the second mold structure for injecting plastic into the accommodating space. The second pushing mechanism is connected to the pushing component. The second pushing mechanism drives the pushing component to pierce through the movable portion, to move the modeled plastic out of the accommodating space.

19 Claims, 7 Drawing Sheets

(56) References Cited

U.S. PATENT DOCUMENTS

| | | | |
|---|---|---|---|
| 2006/0131788 A1* | 6/2006 | Takigawa | 264/328.1 |
| 2009/0108495 A1* | 4/2009 | Takeuchi et al. | 264/266 |
| 2010/0219553 A1* | 9/2010 | Fujimura | 264/132 |
| 2011/0223389 A1 | 9/2011 | Lin | |

FOREIGN PATENT DOCUMENTS

| | | | |
|---|---|---|---|
| EP | 1897669 | * | 3/2008 |
| EP | 1897669 A1 | | 3/2008 |
| TW | I376303 | | 11/2012 |

OTHER PUBLICATIONS

Office action mailed on Sep. 21, 2015 for the China application No. 201210557067.6, p. 3 line 5-31, p. 4 and p. 5 line 1-15. Translation.

* cited by examiner

MODELING APPARATUS AND OPERATION METHOD THEREOF

BACKGROUND OF THE INVENTION

1. Field of the Invention

The present invention relates to a modeling apparatus, and more particularly, to a modeling apparatus and a related operation method capable of manufacturing a complicated structure which has no stress residue.

2. Description of the Prior Art

A conventional injection molding technology is utilized to manufacture a casing of the electronic device. By the conventional injection molding technology, fluid plastic is injected into a modeling chamber by high pressure, and the modeling chamber can be filled with the fluid plastic to model the fluid plastic. The modeling chamber includes two mold structures. The mold structures can be separate from each other, and a pushing mechanism is utilized to move the solid plastic (modeled from the fluid plastic) out of the modeling chamber. The conventional injection molding technology can manufacture the work piece with complicated structure. However, fluidity of the fluid plastic is worse, the work piece manufactured by the conventional injection molding technology has drawback of dimensional constraint. The fluid plastic is injected from the valve by the high pressure, so that distribution of the fluid plastic is not uniform inside the modeling chamber, and the work piece may have fault of stress residue.

The other conventional injection compression molding technology is utilized to manufacture the optical product with high dimensional precision, such as a lens and a light guide plate. Hydraulic cylinder of the conventional injection compression molding technology only moves the core to manufacture the work piece with simple and smooth structure, which means the conventional injection compression molding technology can not manufacture the component with complicated structure. In addition, the conventional injection molding technology and the conventional injection compression molding technology manufacture the product according to shape of the mold structure, and have no appearance decoration function. Therefore, design of a modeling apparatus and an operation method capable of manufacturing the component with complicated structure and having function of appearance decoration is an important issue in the related industry.

SUMMARY OF THE INVENTION

The present invention provides a modeling apparatus and a related operation method capable of manufacturing a complicated structure which has no stress residue for solving above drawbacks.

According to the claimed invention, a modeling apparatus includes a first set and a second set, the first set is movably disposed on the second set. The first set includes a body and a first mold structure. The first mold structure is disposed on a surface of the body. The second set includes a movable portion, a first pushing mechanism, a valve and a second pushing mechanism. The movable portion includes a second mold structure, and the second mold structure is combined with the first mold structure to form an accommodating space. The first pushing mechanism is connected to the movable portion. The movable portion is moved by the first pushing mechanism to combine the second mold structure with the first mold structure. The valve is disposed on the second mold structure for injecting plastic into the accommodating space. The second pushing mechanism is for pushing the plastic out of the accommodating space.

According to the claimed invention, the first set further includes a conveyer, a clamper and an extractor. The conveyer is disposed on the body. A thin film is transmitted by the conveyer to cover the first mold structure. The clamper is disposed on the body for clamping the thin film. The extractor is disposed on the body for extracting gaseous matter between the first mold structure and the thin film.

According to the claimed invention, the first mold structure and the second mold structure respectively are a cavity and a core.

According to the claimed invention, the second pushing mechanism includes a pushing component and a driving unit. The pushing component movably passes through the movable portion, and the pushing component pushes the plastic to move out of the accommodating space. The driving unit is connected to the pushing component, and the driving unit drives the pushing component to pass through the movable portion.

According to the claimed invention, the first pushing mechanism and the driving unit are compression cylinders.

According to the claimed invention, the first set further includes a guiding slot formed on the body, the second set further includes a guiding bar movable inserting into the guiding slot, and the movable portion moves relative to the guiding bar.

According to the claimed invention, the first set moves the movable portion relative to the guiding bar after the plastic is injected into the accommodating space, so as to compress the accommodating space to model the plastic.

According to the claimed invention, the pushing component is a thimble or a taper pin.

According to the claimed invention, the second set further includes a bridging base whereon the first pushing mechanism and the guiding bar are disposed. The first pushing mechanism moves the movable portion relative to the bridging base.

According to the claimed invention, the second set further includes a compression block disposed between the bridging base and the movable portion. The valve and the pushing component pass through the compression block.

According to the claimed invention, the first pushing mechanism moves the movable portion relative to the compression block to separate the movable portion from the bridging base when pressure of the first pushing mechanism is increased, and the movable portion moves toward the compression block by the body to be close to the bridging base when the pressure of the first pushing mechanism is decreased.

According to the claimed invention, the second set further includes a foundation whereon the driving unit and the pushing component are disposed. The driving unit moves the pushing component relative to the bridging base and the compression block.

According to the claimed invention, the second set further includes a constraining slot and a constraining bar. The constraining slot is formed on the bridging base. The constraining bar is disposed on the foundation. The constraining bar movably inserts into the constraining slot.

According to the claimed invention, the second set further includes a measurement device disposed on the bridging base. The measurement device measures a movement distance of the movable portion relative to the bridging base.

According to the claimed invention, decoration ink is disposed on the thin film. The decoration ink is transferred onto the plastic when the plastic is injected into the accommodating space.

According to the claimed invention, an operation method of a modeling apparatus is disclosed. The operation method includes driving a first set to move close to a second set, combining a first mold structure with a second mold structure to form an accommodating space, injecting plastic into the accommodating space, driving a first pushing mechanism to compress the accommodating space, and utilizing a second pushing mechanism to move the plastic out of the accommodating space.

According to the claimed invention, the operation method further includes moving a movable portion relative to a guiding bar to combine the first mold structure with the second mold structure.

According to the claimed invention, driving the first pushing mechanism to compress the accommodating space includes decreasing pressure of the first pushing mechanism to model the plastic by compression of the accommodating space.

According to the claimed invention, the operation method further includes transmitting a thin film, clamping the thin film to fix the thin film on the first mold structure, and extracting gaseous matter inside the first mold structure.

According to the claimed invention, the first pushing mechanism is a compression cylinder, pressure of the compression cylinder is decreased to compress the accommodating space due to movement of the first mold structure and the second mold structure.

According to the claimed invention, combining the first mold structure with the second mold structure to form the accommodating space includes increasing pressure of the first pushing mechanism to combine the first mold structure with the second mold structure to form the accommodating space.

The present invention can preferably manufacture the optical work piece that has features of high dimensional precision, optical property and complicated structural design. The valve of the present invention does not inject the plastic by high pressure, and injecting pressure of the plastic is low to effectively decrease the mold-locking force between the first set and the second set. Exhaust of the gaseous matter during compression of the accommodating space is improved to prevent the modeling plastic from the stress residue, so that the present invention can manufacture the work piece without the stress residue. The present invention further can manufacture the work piece with low tolerance (the work piece without structural deformation), and can further utilize the in-mold decoration technology to transfer the decoration ink of the thin film onto the work piece.

In addition, the accommodating space can be rapidly filled with the plastic due to the compression of the accommodating space even through the plastic is sticky, so that the modeling apparatus of the present invention can manufacture the thin-typed complicated structure, such as the casing of the thin-typed computer. Therefore, the present invention can effectively overcome difficulty of modeling the sticky fluid plastic, and can shorten modeling period of the work piece to increase manufacturing efficiency.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
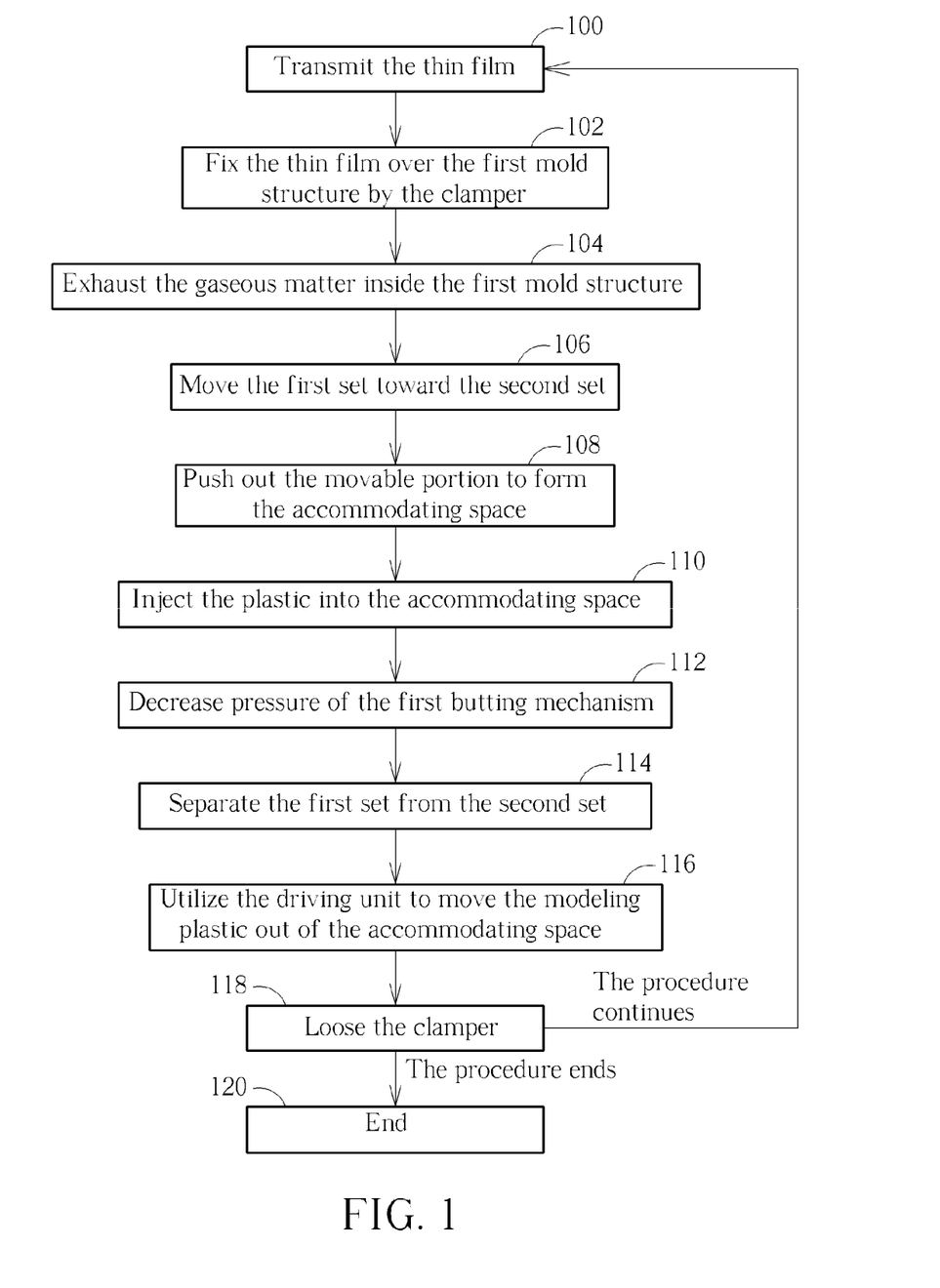
FIG. 1 is a flow char of an operation method of a modeling apparatus according to an embodiment of the present invention.

Please refer to FIG. 1 to FIG. 7. FIG. 1 is a flow char of an operation method of a modeling apparatus 10 according to an embodiment of the present invention. FIG. 2 to FIG. 7 respectively are diagrams of the modeling apparatus 10 in different modes according to the embodiment of the present invention. The modeling apparatus 10 includes a first set 12 and a second set 14. The first set 12 can be movably disposed on the second set 14 to manufacture plastic product. The first set 12 includes a body 16, a first mold structure 18 and a guiding slot 20. The first mold structure 18 can be a sunken space formed on a surface of the body 16 facing the second set 14. The guiding slot 20 is formed inside or by the body 16. The first set 12 further can include a conveyer 22, a clamper 24 and an extractor 26. The conveyer 22 is disposed on the body 16 to transmit a thin film 28 for covering the thin film 28 over the first mold structure 18.

The modeling apparatus 10 can include a plurality of clampers 24 respectively disposed by the first mold structure 18. When the thin film 28 covers the first mold structure 18, the clampers 24 can clamp edges of the thin film 28 to fix position of the thin film 28. The extractor 26 is disposed on the first mold structure 18 for extracting gaseous matter inside the first mold structure 18. Because the thin film 28 covers over the first mold structure 18, the sunken space (the first mold structure 18) is airtight, and inner of the first mold structure 18 can be vacuum after the gaseous matter inside the sunken space is exhausted by the extractor 26, so that the thin film 28 can be smoothly cohered onto an inner surface of the first mold structure 18.

The second set 14 includes a movable portion 30, a first pushing mechanism 32, a guiding bar 34, a valve 36, at least one pushing component 38, a driving unit 40, a bridging base 42, a compression block 44, a foundation 46, a constraining slot 48, a constraining bar 50 and a measurement device 52. The driving unit 40 and the constraining bar 50 are disposed on the foundation 46. The constraining slot 48 is formed on the bridging base 42, and the constraining bar 50 movably inserts into the constraining slot 48, so that the bridging base 42 can be assembled with the foundation 46 via a combination of the constraining slot 48 and the constraining bar 50. A vacant space 54 is formed between the bridging base 42 and the foundation 46. The pushing component 38 is disposed on the foundation 46 and can move inside the vacant space 54 unrestrictedly. A part of the pushing component 38 can movably pass through the bridging base 42, the compression block 44 and the movable portion 30. An assembly of the pushing component 38 and the driving unit 40 is the second pushing mechanism 41. The driving unit 40 drives the part of the pushing component 38 to protrude from the movable portion 30.

The first pushing mechanism 32 and the guiding bar 34 are disposed on the bridging base 42. The guiding bar 34 is sheathed with a sliding slot 56, and the movable portion 30 can move relative to the bridging base 42. The compression block 44 is located between the movable portion 30 and the bridging base 42. The movable portion 30 can move relative to the bridging base 42 via the compression block 44. Therefore, the first pushing mechanism 32 can move the movable portion 30, and the movable portion 30 is separated from the bridging base 42 to cohere onto the body 16 of the first set 12. In addition, the movable portion 30 includes a second mold structure 58. The guiding bar 34 inserts into the guiding slot 20, so the first set 12 can move relative to the second set 14. The first mold structure 18 and the second mold structure 58 can selectively be a cavity and a core. For example, the first mold structure 18 is the cavity (or the core), and the second mold structure 58 is the core (or the cavity) accordingly. The second mold structure 58 can be combined with the first mold structure 18 to form an accommodating space 60 to model the plastic. The first pushing mechanism 32 and the driving unit 40 can be compression cylinders, such as the steam cylinder or the hydraulic cylinder.

Two ends of the valve 36 are respectively disposed on the second set 14 and the second mold structure 58, which means the valve 36 passes through the foundation 46, the bridging base 42 and the compression block 44. The valve 36 is located on an outlet of the second mold structure 58 to point toward the accommodating space 60. The valve 36 can be filled with plastic 62, and the plastic 62 can be injected into the accommodating space 60 via the valve 36. The plastic 62 inside the accommodating space 60 can be transformed into the modeling plastic 64 (the manufactured work piece) by a compression modeling technology. The plastic 62 is a fluid matter, and the modeling plastic 64 can be a solid matter due to compression. The present invention can manufacture the modeling plastic 64 with complicated structure, and the driving unit 40 of the modeling apparatus 10 can pass the pushing component 38 through the movable portion 30, so as to push the modeling plastic 64 out of the accommodating space 60.

Furthermore, the measurement device 52 is disposed on the bridging base 42 to measure a movement distance of the movable portion 30 relative to the bridging base 42. The measurement device 52 can be a magnescale. The magnescale is a magnetic component to detect the movable portion 30, to acquire the movement distance of the movable portion 30 relative to the bridging base 42 according to magnetic flux variation. The modeling apparatus 10 of the present invention utilizes the pressure of the first set 12 and the second set 14 to compress the accommodating space 60, so that the plastic 62 can be transformed into the modeling plastic 64. Thus, the measurement device 52 can detect the compression quantity of the accommodating space 60, which means the movement of the movable portion 30 by the first set 12, to ensure that the accommodating space 60 can be fully filled with the plastic 62 and the plastic 62 can be transformed into the modeling plastic 64 without stress residue. Application of the measurement device 52 is not limited to the above-mentioned magnescale, which depends on design demand, and detailed description is omitted herein for simplicity.

Figure 2:
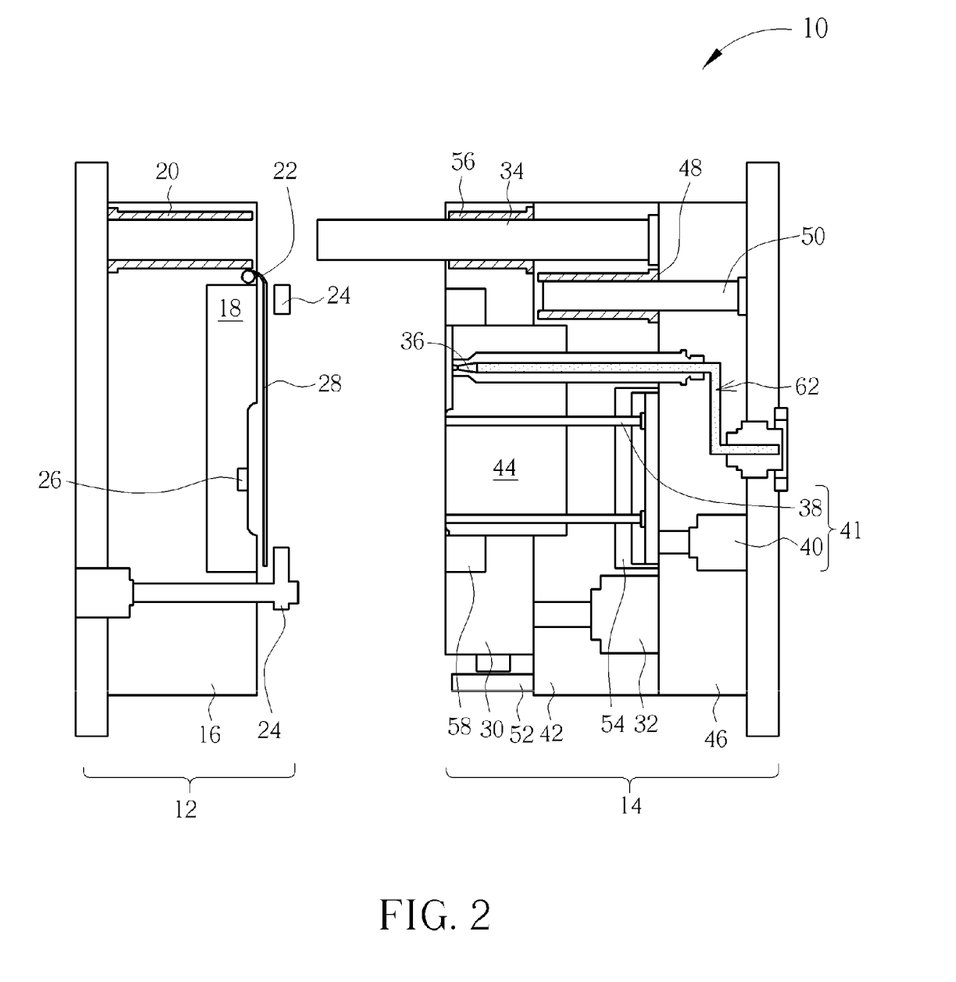
FIG. 2 to FIG. 7 respectively are diagrams of the modeling apparatus in different modes according to the embodiment of the present invention.
Figure 3:
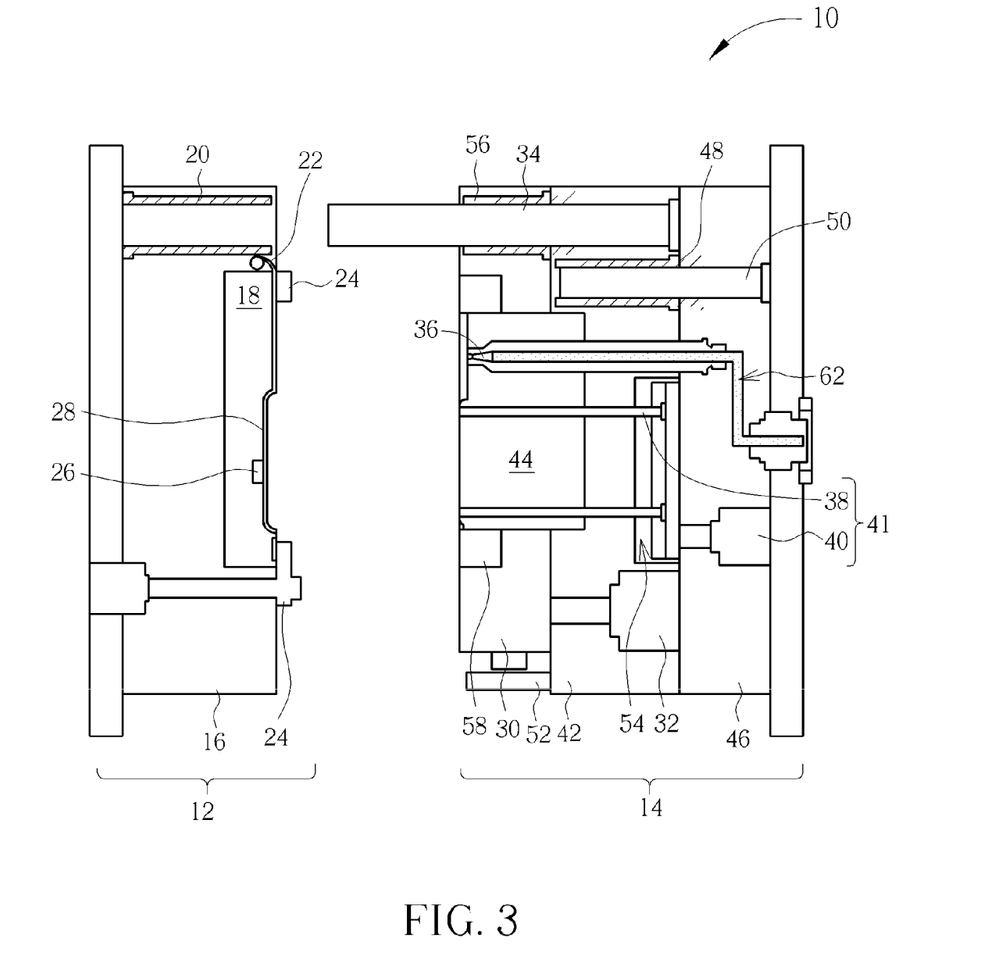

Please refer to FIG. 1. The operation method shown in FIG. 1 is applied to the modeling apparatus 10 shown in FIG. 2 to FIG. 7. First, as shown in FIG. 2, step 100 is executed to transmit the thin film 28 by the conveyer 22, and the thin film 28 can move across the first mold structure 18. Then, step 102 and step 104 are executed as shown in FIG. 3. Step 102 is executed to press the thin film 28 by the clamper 24, so as to fix the thin film 28 over the first mold structure 18. Step 104 is executed to exhaust the gaseous matter inside the first mold structure 18 by the extractor 26. A space between the first mold structure 18 and the thin film 28 is vacuum, and the thin film 28 can be cohered onto the inner surface of the first mold structure 18 by vacuum suction force. The decoration ink can be formed on the thin film 28 in advance.

Figure 4:
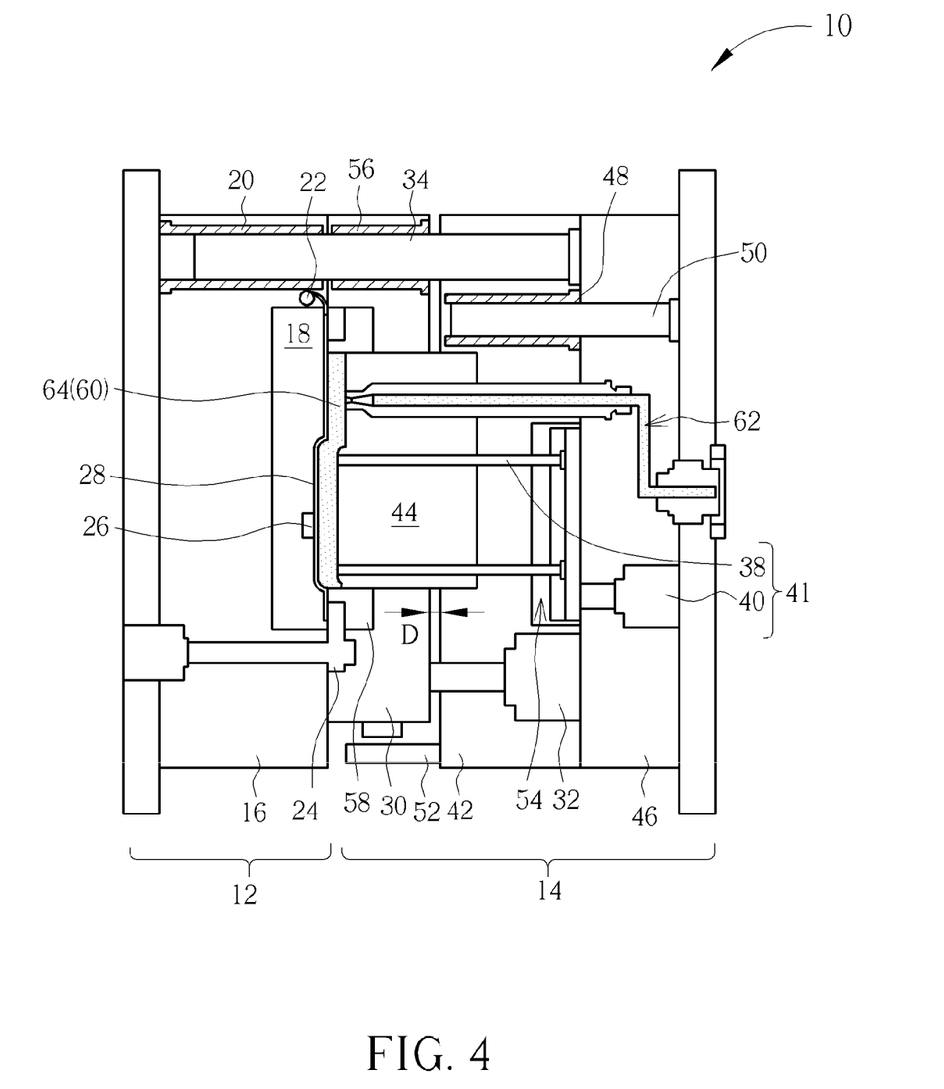

As shown in FIG. 4, step 106 is executed to move the first set 12. The guiding bar 34 can insert into the guiding slot 20, and the first set 12 moves close to the second set 14. Then, step 108 is executed to increase the pressure of the first pushing mechanism 32. It should be mentioned that the first pushing mechanism 32 can push the movable portion 30 outwardly when the first set 12 moves close to the second set 14, or can push the movable portion 30 outwardly when the first set 12 moves toward the second set 14 and stops over at a predetermined position. The first pushing mechanism 32 can move the movable portion 30 relative to the compression block 44 to separate from the bridging base 42, and a distance D between the movable portion 30 and the bridging base 42 corresponds to compression quantity of the modeling plastic 64 (the manufactured work piece). The second mold structure 58 of the movable portion 30 can be combined with the first mold structure 18 to form the accommodating space 60. Then, step 110 is executed to inject the plastic 62 into the accommodating space 60 by the valve 36.

Figure 5:
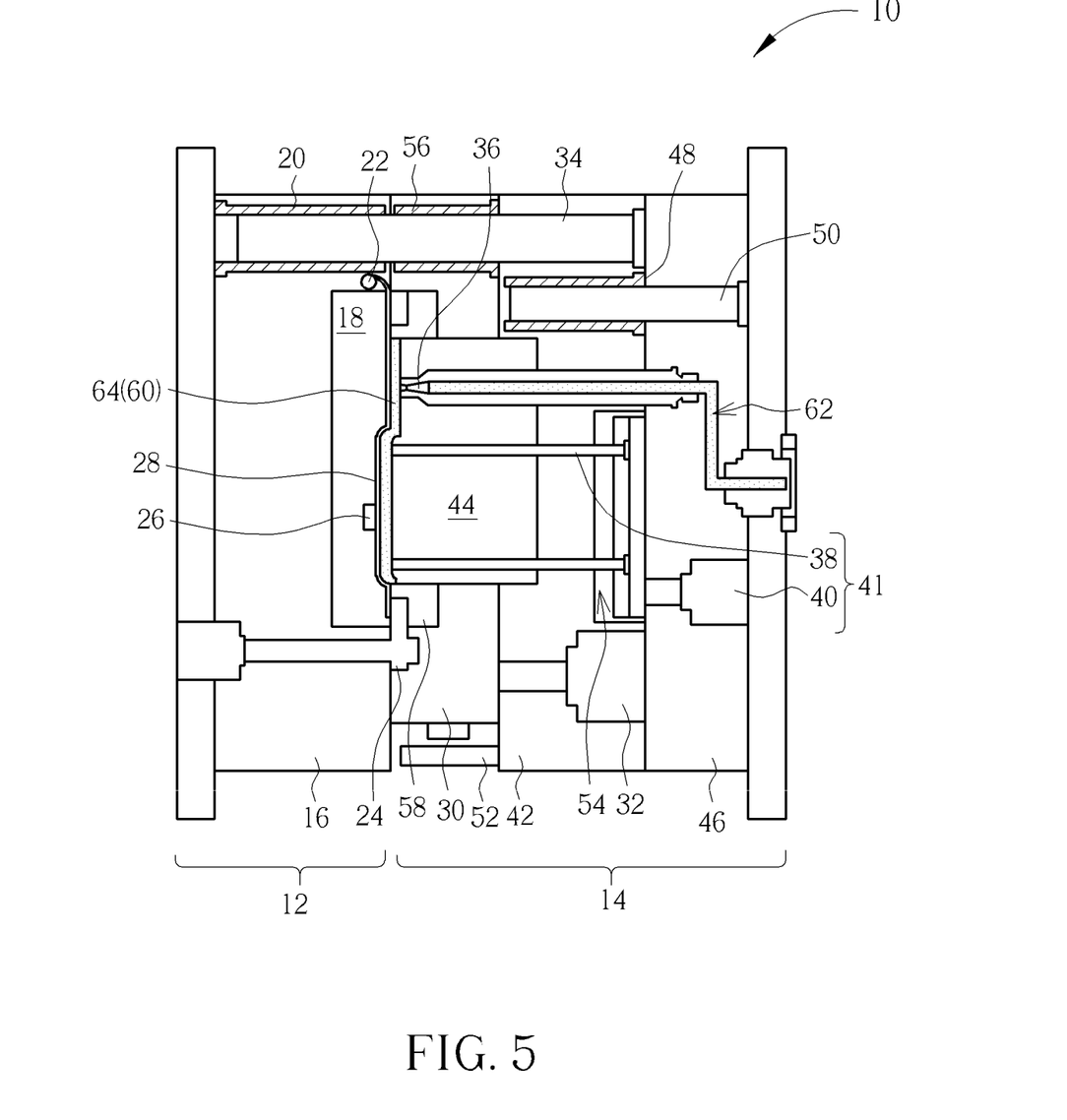

As shown in FIG. 5, the first set 12 slides the movable portion 30 along the guiding bar 34 via the body 16 after the plastic 62 is injected into the accommodating space 60, so that the accommodating space 60 can be compressed to press the plastic 62, and the plastic 62 can be transformed into the modeling plastic 62 due to the high pressure. Then, step 112 is executed to decrease the pressure of the first pushing mechanism 32. The movable portion 30 reversely moves relative to the compression block 44 by the first set 12, which means the reverse movement of the movable portion 30 equals the distance D, and the movable portion 30 backs to an initial position shown in FIG. 5. The first set 12 can press the movable portion 30 to compress the accommodating space 60 via the combination of the guiding slot 20 and the guiding bar 34, and the plastic 62 can be transformed into the modeling plastic 64 by the compression modeling technology. The compression quantity of the accommodating space 60 (difference between volume of the modeling plastic 64 shown in FIG. 4 to FIG. 5) that is controlled by a movement of the body 16 can correspond to the distance D of the movement of the movable portion 30 relative to the bridging base 42.

Figure 6:
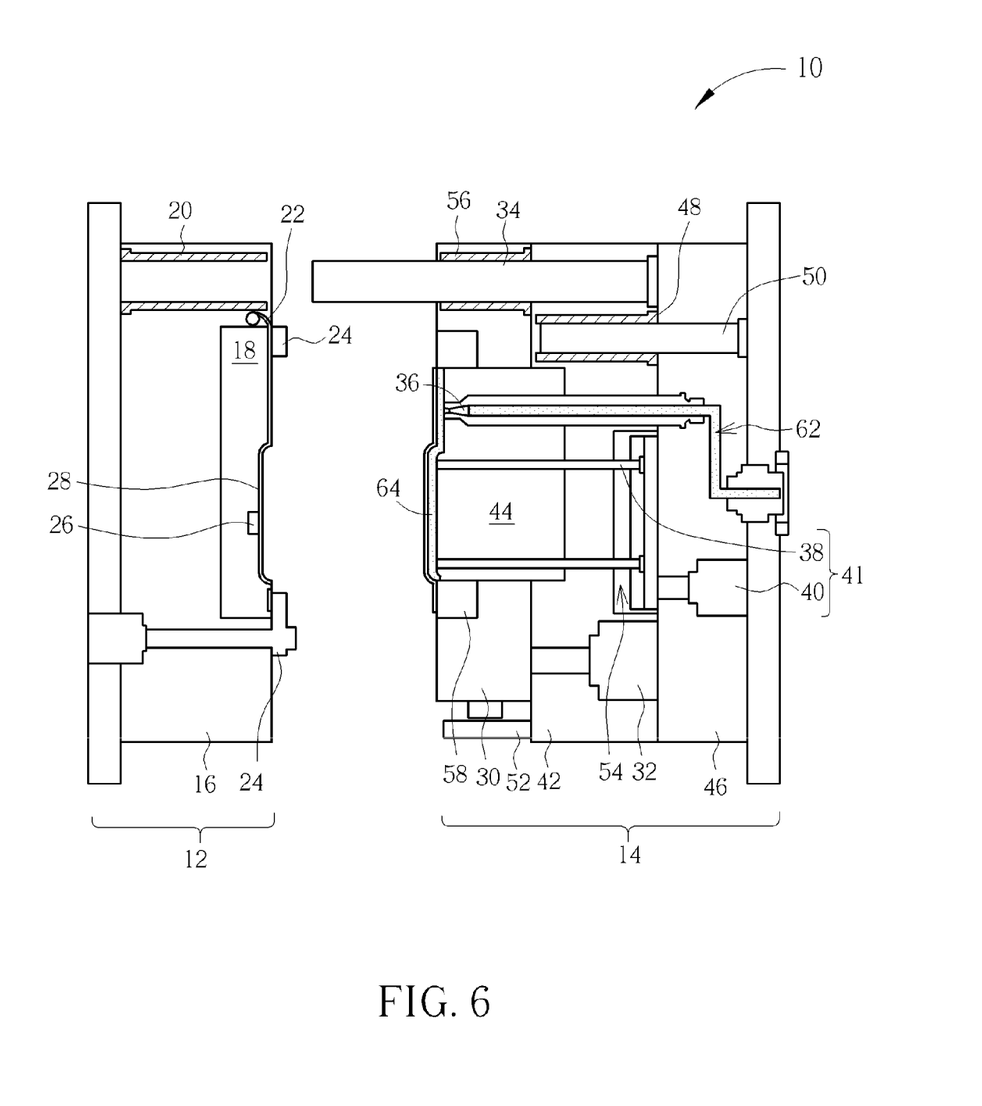
Figure 7:
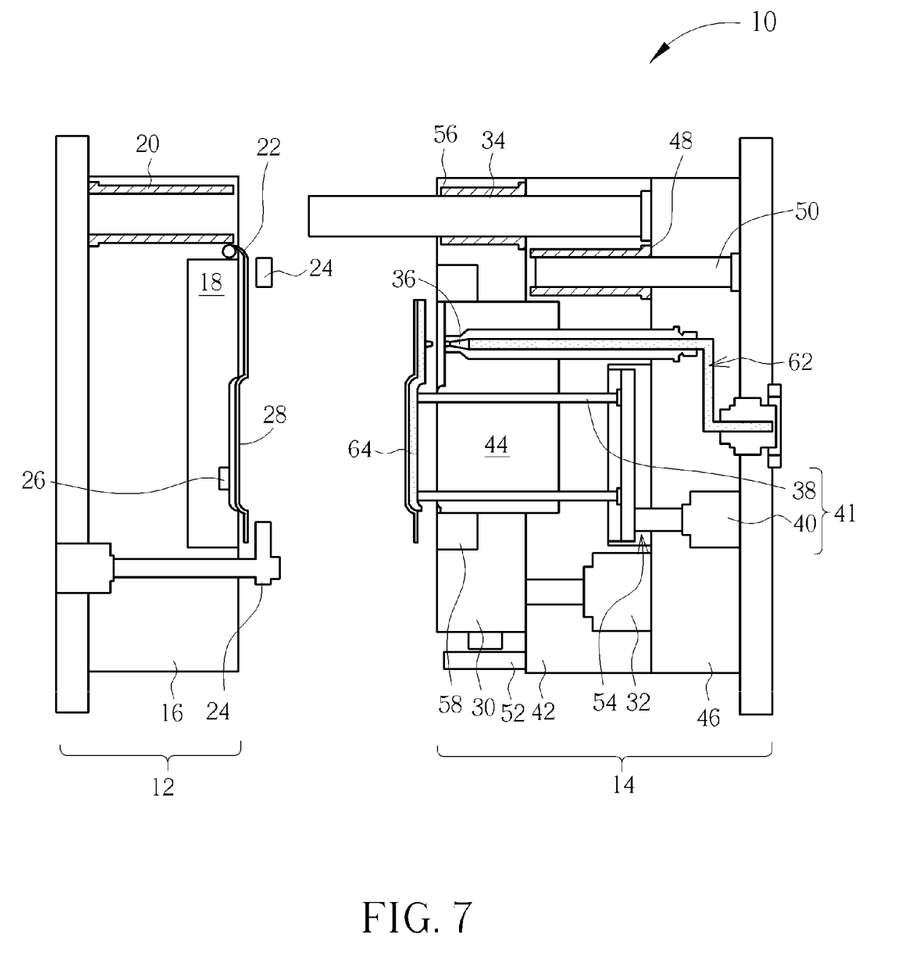

As shown in FIG. 6, step 114 is executed to separate the first set 12 from the second set 14. The modeling plastic 64 is formed by the compression modeling technology, and the decoration ink of the thin film 28 has been transferred onto the modeling plastic 64. Thus, the modeling apparatus 10 of the present invention can manufacture the work piece (the modeling plastic 64) with variety appearance by in-mold decoration technology. Final, as shown in FIG. 7, step 116 is executed to protrude the pushing component 38 from the second mold structure 58 by the driving unit 40, so as to move the modeling plastic 64 out of the accommodating space 60. The present invention can utilize the thimble or the taper pin to be the pushing component 38 according to structural design of the work piece, component having the same function as the pushing component 38 belongs to a scope of the present invention, and detailed description is omitted herein for simplicity. Step 118 is executed to loose the clamper 24. As the modeling apparatus 10 is applied to manufacture the work piece again, the former thin film 28 can be removed and the present thin film 28 can be transmitted across the first mold structure 18 by the conveyer 22. As manufacturing procedure of the modeling apparatus 10 ends, the conveyer 22 is utilized to remove the former thin film 28, and then the modeling apparatus 10 can be shut down.

In conclusion, the modeling apparatus of the present invention can combine the first mold structure of the first set with the second mold structure of the second set to form the accommodating space by low mold-locking force. Then the plastic is injected into the accommodating space by the valve, the pressure of the first pushing mechanism is decreased to release pressure between the first set and the second set, and the accommodating space can be compressed by the movement of the first mold structure and the second mold structure to model the plastic according to inner structure of the accommodating space, so the fluid plastic can be transformed into the solid modeling plastic. During modeling of the plastic, the decoration ink of the thin film fixed inside the first mold structure can be transferred onto the modeling plastic due to high temperature and high pressure, so as to transfer the pattern by the in-mold decoration technology. Besides, the modeling apparatus of the present invention can further utilize the pushing component to press the modeling plastic with complicated structure, so as to move the modeling plastic out of the accommodating space smoothly.

Comparing to the prior art, the present invention can preferably manufacture the optical work piece that has features of high dimensional precision, optical property and complicated structural design. The valve of the present invention does not inject the plastic by high pressure, and injecting pressure of the plastic is low to effectively decrease the mold-locking force between the first set and the second set. Exhaust of the gaseous matter during compression of the accommodating space is improved to prevent the modeling plastic from the stress residue, so that the present invention can manufacture the work piece without the stress residue. The present invention further can manufacture the work piece with low tolerance (the work piece without structural deformation), and can further utilize the in-mold decoration technology to transfer the decoration ink of the thin film onto the work piece.

In addition, the accommodating space can be rapidly filled with the plastic due to the compression of the accommodating space even through the plastic is sticky, so that the modeling apparatus of the present invention can manufacture the thin-typed complicated structure, such as the casing of the thin-typed computer. Therefore, the present invention can effectively overcome difficulty of modeling the sticky fluid plastic, and can shorten modeling period of the work piece to increase manufacturing efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A modeling apparatus comprising:
   a first set, the first set comprising:
      a body; and
      a first mold structure disposed on a surface of the body; and
   a second set, the first set being movably disposed on the second set, the second set comprising:
      a movable portion, the movable portion comprising a second mold structure;
      a valve disposed on the second mold structure for injecting plastic into an accommodating space formed between the first mold structure and the second mold structure;
      a first pushing mechanism connected to the movable portion, the body moving toward the movable portion in a first direction and the movable portion being moved by the first pushing mechanism in a second direction opposite to the first direction before the valve injects the plastic, so as to combine the second mold structure with the first mold structure to form the accommodating space; and
      a second pushing mechanism for pushing the plastic out of the accommodating space.

2. The modeling apparatus of claim 1, wherein the first set further comprises:
   a conveyer disposed on the body, a thin film being transmitted by the conveyer to cover the first mold structure;
   a damper disposed on the body for clamping the thin film; and
   an extractor disposed on the body for extracting gaseous matter between the first mold structure and the thin film.

3. The modeling apparatus of claim 1, wherein the second pushing mechanism comprises:
   a pushing component movably passing through the movable portion, the pushing component pushing the plastic to move out of the accommodating space; and
   a driving unit connected to the pushing component, the driving unit driving the pushing component to pass through the movable portion.

4. The modeling apparatus of claim 3, wherein the first pushing mechanism and the driving unit are compression cylinders.

5. The modeling apparatus of claim 1, wherein the first set further comprises a guiding slot formed on the body, the second set further comprises a guiding bar movable inserting into the guiding slot, and the movable portion moves relative to the guiding bar.

6. The modeling apparatus of claim 5, wherein the first set moves the movable portion relative to the guiding bar after the plastic is injected into the accommodating space, so as to compress the accommodating space to model the plastic.

7. The modeling apparatus of claim 3, wherein the pushing component is a thimble or a taper pin.

8. The modeling apparatus of claim 5, wherein the second set further comprises:
   a bridging base whereon the first pushing mechanism and the guiding bar are disposed, the first pushing mechanism moving the movable portion relative to the bridging base.

9. The modeling apparatus of claim 8, wherein the second set further comprises:
   a compression block disposed between the bridging base and the movable portion, the valve and the pushing component passing through the compression block.

10. The modeling apparatus of claim 9, wherein the first pushing mechanism moves the movable portion relative to the compression block to separate the movable portion from the bridging base when pressure of the first pushing mechanism is increased, and the movable portion moves toward the compression block by the body to be close to the bridging base when the pressure of the first pushing mechanism is decreased.

11. The modeling apparatus of claim 9, wherein the second set further comprise:
   a foundation whereon the driving unit and the pushing component are disposed, the driving unit moving the pushing component relative to the bridging base and the compression block.

12. The modeling apparatus of claim 11, wherein the second set further comprises:
   a constraining slot formed on the bridging base; and
   a constraining bar disposed on the foundation, the constraining bar movably inserting into the constraining slot.

13. The modeling apparatus of claim 8, wherein the second set further comprises:

a measurement device disposed on the bridging base, the measurement device measuring a movement distance of the movable portion relative to the bridging base.

14. The modeling apparatus of claim 2, wherein decoration ink is disposed on the thin film, the decoration ink is transferred onto the plastic when the plastic is injected into the accommodating space.

15. An operation method of a modeling apparatus, the operation method comprising:
   driving a first set to move close to a second set in a first direction and driving a first pushing mechanism to move a movable portion in a second direction opposite to the first direction to combine a second mold structure of the second set with a first mold structure of the first set so as to form an accommodating space between the first mold structure and the second mold structure before injecting plastic into the accommodating space;
   injecting the plastic into the accommodating space;
   driving the first pushing mechanism to compress the accommodating space; and
   utilizing a second pushing mechanism to move the plastic out of the accommodating space.

16. The operation method of claim 15, wherein driving the first pushing mechanism to compress the accommodating space comprises:
   decreasing pressure of the first pushing mechanism to model the plastic by compression of the accommodating space.

17. The operation method of claim 15, further comprising:
   transmitting a thin film;
   clamping the thin film to fix the thin film on the first mold structure; and
   extracting gaseous matter inside the first mold structure.

18. The operation method of claim 15, wherein the first pushing mechanism is a compression cylinder, pressure of the compression cylinder is decreased to compress the accommodating space due to movement of the first mold structure and the second mold structure.

19. The operation method of claim 15, wherein combining the first mold structure of the first set with the second mold structure of the second set to form the accommodating space comprises:
   increasing pressure of the first pushing mechanism to combine the first mold structure with the second mold structure to form the accommodating space.

* * * * *